Patented Sept. 12, 1922.

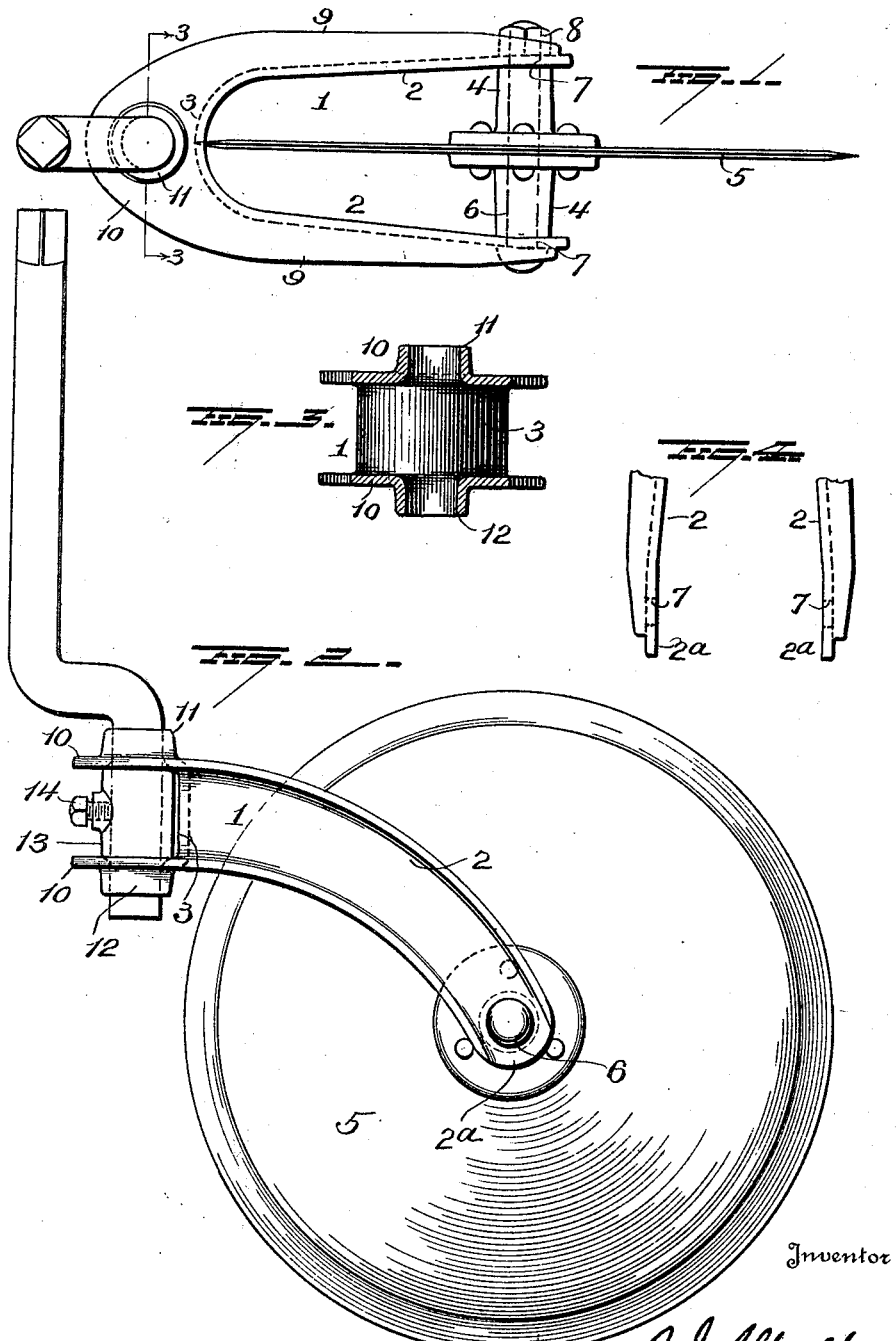

1,428,518

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

YOKE CONSTRUCTION FOR ROLLING COLTERS AND THE LIKE.

Application filed February 13, 1922. Serial No. 536,208.

*To all whom it may concern:*

Be it known that I, RUDOLPH J. ALTGELT, a citizen of the United States, and a resident of South Bend, in the county of Saint Joseph and State of Indiana, have invented certain new and useful Improvements in Yoke Constructions for Rolling Colters and the like; and I do hereby declare the following to be a full, clear, and exact description of the invention, such as will enable others skilled in the art to which it appertains to make and use the same.

This invention relates to improvements in yoke construction for rolling colters and the like,—one object of the invention being to provide a simple, substantial and light yoke construction for a rolling colter, which may be made in a single piece of sheet steel and be provided with integral bearing sleeves for the vertical supporting standard, which sleeves shall project in opposite directions,—upwardly and downwardly respectively,—from the head of the yoke.

With this and other objects in view, the invention consists in certain novel features of construction as hereinafter set forth and pointed out in the claims.

In the accompanying drawings; Figure 1 is a plan view showing an embodiment of my invention; Figure 2 is a view in side elevaton of the same; Figure 3 is an enlarged sectional view on the line 3—3 of Figure 1 with the supporting shaft omitted, and Figure 4 is a fragmentary view of the rear portions of the yoke arms.

My improved yoke 1 is made in a single piece of sheet steel and comprises arms 2, 2 connected by an integral curved portion 3,—said arms being at a slight angle to each other throughout the greater portions of their length and having their free end portions 2ª bent somewhat inwardly so as to be disposed parallel with each other for the accommodation of the hub 4 of a colter disk 5 and the spindle 6, which latter passes through said hub and disk and through holes 7 in the yoke arm portions 2ª. In the embodiment of the invention shown in Figure 1, the spindle 6 is shown in the form of a bolt, headed at one end and provided at its other end with a nut 8.

The arms of the yoke are preferably made curved and are provided at their edges with laterally projecting flanges 9, 9, and these merge into wider flanges 10 which extend around the curved connecting head portion 3 of the yoke.

The flanges 10 which form portions of the head of the yoke are disposed parallel with each other and are provided with integral sleeves 11, 12 which project in opposite directions from each other. These sleeves may be punched from the metal of the flanges 10, the integral sleeve 11 projecting upwardly from one of said flanges and the integral sleeve 12 projecting downwardly from the other flange 10. The sleeves thus projecting from the outer faces of the respective flanges or head members 10 serve as extended bearings on the cranked lower portion of a supporting standard 13. A sleeve 14 may be located on the crank of the standard, between the respective flanges or head member 10 and secured to the standard by means of a set screw 14ª.

Having fully described my invention what I claim as new and desire to secure by Letters-Patent, is :—

1. A sheet metal yoke, comprising two arms, integrally connected at one end, said yoke provided with parallel flanges projecting forwardly from the connected portion of said arms and forming therewith a yoke head, one of said flanges having an integral upwardly projecting bearing sleeve and the other flange having an integral downwardly projecting bearing sleeve.

2. A sheet metal yoke, comprising two arms integrally connected at one end and adapted at the other end to receive a disk mounting, flanges at the edges of each arm, parallel flanges projecting forwardly from the connected ends of said arms and forming continuations of the first mentioned flanges, said parallel flanges having punched bearing sleeves projecting from the outer faces of said parallel flanges.

In testimony whereof, I have signed this specification in the presence of two subscribing witnesses.

RUDOLPH J. ALTGELT.

Witnesses:
JENNIE M. DAVIS,
EMMA ULLERY.